United States Patent
Pretz

(10) Patent No.: US 11,596,914 B2
(45) Date of Patent: Mar. 7, 2023

(54) PROCESSES FOR COMMENCING OPERATIONS OF FLUIDIZED CATALYTIC REACTOR SYSTEMS

(71) Applicant: Dow Global Technologies LLC, Midland, MI (US)

(72) Inventor: Matthew T. Pretz, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/256,690

(22) PCT Filed: Jun. 26, 2019

(86) PCT No.: PCT/US2019/039212
§ 371 (c)(1),
(2) Date: Dec. 29, 2020

(87) PCT Pub. No.: WO2020/009862
PCT Pub. Date: Jan. 9, 2020

(65) Prior Publication Data
US 2021/0260555 A1    Aug. 26, 2021

Related U.S. Application Data

(60) Provisional application No. 62/694,190, filed on Jul. 5, 2018.

(51) Int. Cl.
*B01J 8/26* (2006.01)
*C10G 11/18* (2006.01)
(Continued)

(52) U.S. Cl.
CPC ............... *B01J 8/001* (2013.01); *B01J 8/125* (2013.01); *B01J 8/26* (2013.01); *C10G 2/333* (2013.01);
(Continued)

(58) Field of Classification Search
CPC ............... C10G 11/18–187; B01J 8/001; B01J 8/1809; B01J 8/1836; B01J 8/26; B01J 2208/00716
See application file for complete search history.

(56) References Cited

U.S. PATENT DOCUMENTS

| 3,033,906 A | 5/1962 | Hay et al. |
| 3,657,153 A | 4/1972 | Bucur et al. |

(Continued)

FOREIGN PATENT DOCUMENTS

| EP | 337578 A1 | 2/1995 |
| WO | 3156960 A1 | 8/2001 |

(Continued)

OTHER PUBLICATIONS

Sadeghbeigi, Reza, Fluid Catalytic Cracking Handbook, Third Edition, Chapter 10: pp. 197-219 (Year: 2012).*

(Continued)

*Primary Examiner* — Renee Robinson
(74) *Attorney, Agent, or Firm* — Dinsmore & Shohl LLP

(57) ABSTRACT

A process for commencing a continuous reaction in a reactor system includes introducing a catalyst to a catalyst processing portion of the reactor system, the catalyst initially having a first temperature of 500 C or less, and contacting the catalyst at the first temperature with a commencement fuel gas stream, which includes at least 80 mol % commencement fuel gas, in the catalyst processing portion. Contacting of the catalyst with the commencement fuel gas stream causes combustion of the commencement fuel gas. The process includes maintaining the contacting of the catalyst with the commencement fuel gas stream until the temperature of the catalyst increases from the first temperature to a (Continued)

second temperature at which combustion of a regenerator fuel source maintains an operating temperature range in the catalyst processing portion.

20 Claims, 6 Drawing Sheets

(51) Int. Cl.
*B01J 8/00* (2006.01)
*B01J 8/12* (2006.01)
*C10G 2/00* (2006.01)
*C10G 9/32* (2006.01)
*C10G 11/22* (2006.01)

(52) U.S. Cl.
CPC .............. *C10G 9/32* (2013.01); *C10G 11/182* (2013.01); *C10G 11/187* (2013.01); *C10G 11/22* (2013.01); *B01J 2208/00017* (2013.01); *B01J 2208/00716* (2013.01); *C10G 2300/1081* (2013.01); *C10G 2300/1092* (2013.01); *C10G 2300/1096* (2013.01)

(56) References Cited

U.S. PATENT DOCUMENTS

| | | | |
|---|---|---|---|
| 4,072,600 A * | 2/1978 | Schwartz | B01J 23/38 208/113 |
| 7,595,427 B2 | 9/2009 | Sanfilippo et al. | |
| 8,669,406 B2 | 3/2014 | Pretz et al. | |
| 9,815,040 B2 | 11/2017 | Pretz et al. | |
| 9,827,543 B2 | 11/2017 | Pretz et al. | |
| 9,834,496 B2 | 12/2017 | Pretz et al. | |
| 10,065,905 B2 | 9/2018 | Pretz et al. | |
| 2004/0029715 A1 | 2/2004 | Schindler et al. | |
| 2004/0259727 A1 | 12/2004 | Bartolini et al. | |
| 2010/0004118 A1 | 1/2010 | Liu et al. | |
| 2010/0236985 A1 | 9/2010 | Luo et al. | |
| 2011/0269620 A1* | 11/2011 | Myers | B01J 29/90 502/38 |
| 2013/0137909 A1* | 5/2013 | Dean | C10G 35/04 585/324 |
| 2014/0200385 A1 | 7/2014 | Pretz et al. | |
| 2014/0378731 A1 | 12/2014 | Iezzi et al. | |
| 2016/0060542 A1 | 3/2016 | Sugita et al. | |
| 2016/0152901 A1 | 6/2016 | Dufresne | |
| 2017/0087528 A1 | 3/2017 | Pretz et al. | |

FOREIGN PATENT DOCUMENTS

| | | |
|---|---|---|
| WO | 32096844 A1 | 12/2002 |
| WO | 2005077867 A2 | 8/2005 |
| WO | 2010107591 A1 | 9/2010 |
| WO | 2013009820 A1 | 1/2013 |
| WO | 2016160273 A1 | 10/2016 |
| WO | 2017151361 A1 | 9/2017 |

OTHER PUBLICATIONS

Examination Report pertaining to corresponding G.C.C. Patent Application No. 2019-37879, dated Apr. 29, 2020.
Examination Report pertaining to corresponding G.C.C. Patent Application No. 2019-37879, dated Jul. 15, 2020.
International Search Report and Written Opinion pertaining to PCT/US2019/039209, dated Oct. 2, 2019.
International Search Report and Written Opinion pertaining to PCT/US2019/039212, dated Oct. 1, 2019.
International Search Report and Written Opinion pertaining to PCT/US2019/039216, dated Oct. 9, 2019.
Deutschmann, et al., Hydrogen assisted catalytic combustion of methane on platinum; Catalysis Today, 2000, 59 (1-2), 141-150.
Warnatz, et al., A model of elementary chemistry and fluid mechanics in the combustion of hydrogen on platinum surfaces; Combustion and Flame, (1994), 96(4), 393-406.
Rinnemo, et al., Experimental and numerical investigation of the catalytic ignition of mixtures of hydrogen and oxygen on platinum Combustion and Flame, (1977), 111(4), 312-326.
Tiernan, et al., Effects of ceria on the combustion activity and surface properties of Pt/Al2O3 catalysts; Applied Catalysis, B. Environmental, (1998), 19(1), 23-35.
Ikeda, et al., Surface kinetics for catalytic combustion of hydrogen-air mixtures on platinum at atmospheric pressure in stagnation flows; Surface Science, (1995), 326(1/2), 11-26.
Notice of Allowance and Fee(s) Due dated Apr. 13, 2022, pertaining to U.S. Appl. No. 17/256,706, 13 pgs.
U.S. Office Action dated Dec. 21, 2001 pertaining to U.S. Appl. No. 17/256,706, filed Dec. 29, 2020, 21 pages.
U.S. Office Action dated Aug. 3, 2022 pertaining to U.S. Appl. No. 17/496,308, filed Oct. 7, 2021, pp. 1-38.
English Translation of Argentia Substantive Examination Report pertaining to AR Patent Application No. 20190101925, 4 pgs.
English Translation of Argentia Substantive Examination Report pertaining to AR Patent Application No. 20190101924, 3 pg.

* cited by examiner

PROCESSES FOR COMMENCING OPERATIONS OF FLUIDIZED CATALYTIC REACTOR SYSTEMS

CROSS-REFERENCE TO RELATED APPLICATIONS

This application is a National Stage Entry under 35 U.S.C. § 371 of International Patent Application No. PCT/US2019/039212, filed Jun. 26, 2019, which claims priority to U.S. Provisional Patent Application Ser. No. 62/694,190, filed on Jul. 5, 2018, the entire disclosures of which are hereby incorporated by reference.

BACKGROUND

Field

The present disclosure generally relates to chemical processing systems and the operation thereof and, more specifically, to processes for commencing the operation of chemical processing systems.

Technical Background

Light olefins may be utilized as base materials to produce many types of goods and materials. For example, ethylene may be utilized to manufacture polyethylene, ethylene chloride, or ethylene oxides. Such products may be utilized in product packaging, construction, textiles, etc. Thus, there is an industry demand for light olefins, such as ethylene, propylene, and butene.

Light olefins may be produced by different reaction processes depending on the given chemical feed stream, such as a product stream from a crude oil refining operation. Many light olefins may be produced through various catalytic processes, such as through catalytic dehydrogenation for example, in which the feed stream is contacted with a fluidized catalyst that facilitates conversion of the feed stream into the light olefins.

However, at some point, reactor operation must be stopped and started again (or started for the first time). For example, over time, the catalyst may become deactivated and must be removed from the reaction process and replaced, requiring reactor shut down. Reactor cleaning may be necessary as well, or periodic reactor malfunction may cause unwanted shutdown.

BRIEF SUMMARY

There is a continued need for improved processes for commencing operations of reactor systems, such as for reactor systems that process chemical streams to produce light olefins or other chemical products. Many reactor systems for processing chemical streams to produce light olefins and other chemicals utilize relatively hot catalyst, such as those catalysts heated to temperatures greater than 350° C. The catalyst may be circulated through fluidized reactor systems, such as through a reactor portion (where chemical products are made) and through a catalyst processing portion (where the catalyst is regenerated, such as by removal of coke, by heating of the catalyst, or by other processes). As used herein, the term "fluidized reactor system" refers to a reactor system in which one or more reactants are contacted with a fluidized catalyst. For example, in a fluidized reactor system, a feed stream containing one or more reactants may be contacted with the circulating catalyst at an operating temperature to conduct a continuous reaction to produce the product stream.

In endothermic fluidized reactor systems, the reactor system includes a heat source to drive the process. For example, in fluidized catalytic cracking ("FCC") reactions, coke generated by the reaction and deposited on the catalyst may be combusted in the regenerator during steady state operation. As another non-limiting example, in fluidized catalytic dehydrogenation (FCDh) reactions, supplemental fuel may be added to a combustor to provide the heat for the endothermic reaction along with combustion of a small amount of coke from the reaction. Supplemental fuels may include significant proportions of methane due to the affordable cost of methane and its energy efficiency at relatively high temperatures, such as those of the catalyst during operation (e.g., temperatures above 650° C.). However, for combustion of methane, the conversion rate and energy efficiency is relatively low at temperatures less than 650 degrees Celsius (° C.) (e.g., less than 40%). During commencement of the continuous reaction in the fluidized reactor systems, the catalyst may be heated to increase the temperature of the catalyst to the operating temperature of the reactor system. However, such heating may be inefficient, or even impossible when utilizing methane as a fuel source for catalytic combustion within the regenerator due to low conversion rates of methane at temperatures less than 650° C.

According to one or more embodiments, since methane in the supplemental fuel does not combust at a high conversion rate at temperatures less than 650° C., some fluidized reaction systems may include an external heat source, such as a heated gas stream heated by flame-driven combustion of a fuel, to increase the temperature of the catalyst in the reactor system during commencement of the continuous reaction. Fluidized reactor systems may include vessels and other components that may be refractory lined and designed for the operating temperatures of the process. The operating temperatures of the process refer to temperatures of the catalyst in the reactor system at steady state operation of the reactor system. Refractory-lined vessels operating at high temperatures (e.g., internal process temperatures greater than 350° C. and shell wall temperatures of the refractory lined equipment between 80 and 200° C.) may lose a significant amount of heat to the environment. Therefore, if the external heat (e.g., heated gas stream) is fired to the normal operating temperatures of the reactor system, or a temperature slightly less than the operating temperatures because of air distributor design limitations, the equilibrium temperature of the catalyst in the fluidized bed will be substantially less than the operating temperatures of the reactor system due to heat loss from the vessel. Therefore, there is a gap between the equilibrium temperature achievable by the external heat source and the operating temperatures of the reactor system, which operating temperatures may be necessary to burn the supplemental fuel or coke.

To overcome this temperature difference, some fluidized reactor systems may include a fuel oil system for burning a fuel oil or kerosene within a combustor of the catalyst processing portion during commencement to further increase the temperature of the catalyst to a temperature sufficient to burn the supplemental fuel (i.e., methane) and/or coke at a conversion required to maintain steady-state operation of the reactor system. However, fuel oil systems require specialized equipment, such as storage tanks, control equipment, pumps, off-loading equipment, and fuel oil distributors within the combustor, for example, to store and handle the fuel oil. This specialized equipment for the fuel oil systems substantially increases the capital cost of the fluidized reactor systems. For these reasons, such fuel oil systems may be undesirable, and not used in the embodiments disclosed herein.

Therefore, there is an ongoing need for processes for commencing continuous reactions in reactor systems that efficiently heat the reactor system and catalyst to the operating temperature range of the reactor system without requiring a fuel oil system. According to one or more embodiments, a process for commencing continuous reaction in the reactor system of the present disclosure includes heating the catalyst to the operating temperature of the reactor system by contacting the catalyst, which may include platinum, palladium, or combinations thereof, with a commencement fuel gas stream that includes a commencement fuel gas. As used herein, the term "commencement fuel gas" refers to a fuel gas that undergoes combustion in the presence of the catalyst at a conversion of greater than 50% at temperatures less than 500° C. Contact of the catalyst with the commencement fuel gas stream may cause combustion of the commencement fuel gas at high conversion rates at temperatures less than 500° C. For example, in some embodiments, the commencement fuel gas may include hydrogen. It has been found that at temperatures greater than or equal to 100° C., contacting hydrogen with a platinum and/or palladium catalyst may result in a conversion of hydrogen of nearly 100%. The commencement fuel gas stream may also include commencement fuel gases other than hydrogen, as discussed in further detail herein. Utilizing the commencement fuel gas to heat up the catalyst during commencement of the continuous reaction in the reactor system may reduce or eliminate the additional capital costs of the fluidized reactor system by reducing or eliminating the need for a fuel oil system for the combustor.

According to one or more aspects of the present disclosure, a process for commencing continuous reaction in a reactor system may include introducing a catalyst to a catalyst processing portion of the reactor system, the catalyst initially having a first temperature of 500° C. or less, and contacting the catalyst at the first temperature with a commencement fuel gas stream comprising at least 80 mol % of a commencement fuel gas in the catalyst processing portion. Contacting the catalyst with the commencement fuel gas stream may cause combustion of the commencement fuel gas. The process may further include maintaining the contacting of the catalyst with the commencement fuel gas stream until the temperature of the catalyst increases from the first temperature to a second temperature at which combustion of a regenerator fuel source maintains an operating temperature range in the catalyst processing portion.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
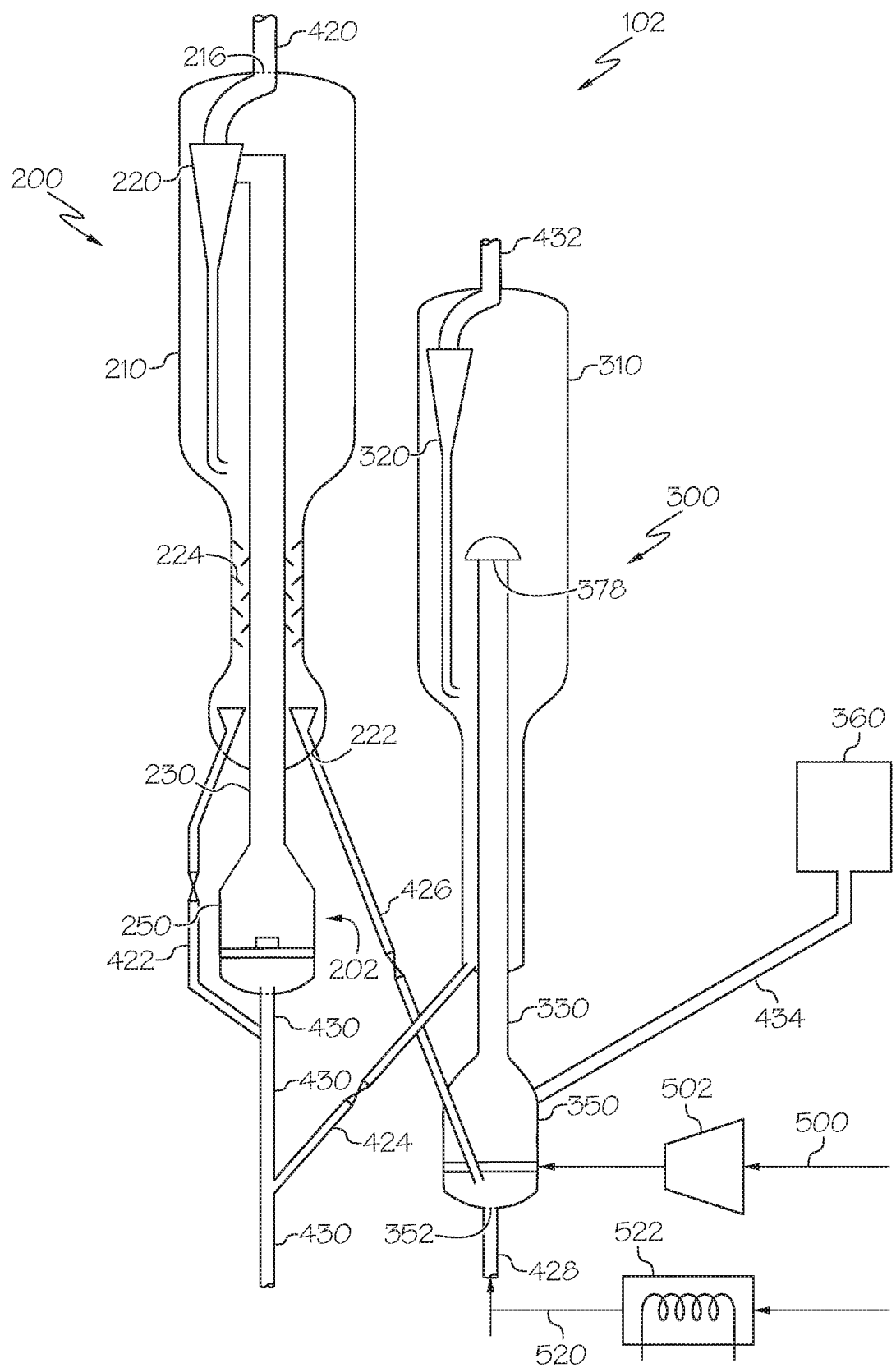
FIG. 1 schematically depicts a reactor system, according to one or more embodiments described herein.

It should be understood that the drawings are schematic in nature, and do not include some components of a reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure is directed to processes for commencing reactions in a reactor system that utilizes a catalyst. For example, in some embodiments, the process for commencing a continuous reaction in the reactor system may include introducing a catalyst to a catalyst processing portion of the reactor system. The catalyst may be a catalyst capable of catalyzing combustion of the commencement fuel gas. The catalyst initially may have a first temperature of 500° C. or less. The process may further include contacting the catalyst at the first temperature with a commencement fuel gas stream comprising at least 80 mol % commencement fuel gas. Contacting of the catalyst with the commencement fuel gas stream may cause combustion of at least a portion of the commencement fuel gas. The process may further include maintaining the contacting of the catalyst with the commencement fuel gas stream until the temperature of the catalyst increases from the first temperature to a second temperature at which combustion of a regenerator fuel source (such as methane) can be utilized to maintain an operating temperature range in the catalyst processing portion.

Catalytic combustion of the commencement fuel gas may occur at the first temperature of the catalyst, which is less than 500° C., and may produce sufficient heat to heat the catalyst to a second temperature, which may be within the operating temperature range of the reactor system and/or greater than a temperature at which methane can be used as the supplemental fuel, without burning a fuel oil, such as kerosene for example, in the catalyst processing portion of the reactor system. Eliminating fuel oil from the catalyst processing portion may reduce or eliminate capital costs for specialized equipment for storing, off-loading, and conveying fuel oils.

According to additional embodiments, commencement of the continuous reaction in the reactor system through catalytic combustion of the commencement fuel gas may enable elimination of or reduction in size of one or more combustion devices (i.e., duct burner, fired heater, or the like) that may be used for producing a heated gas to dry a refractory lining of the reactor system or preheat the catalyst.

As used herein, "continuous reaction" refers to a chemical reaction conducted by feeding reactants, catalyst, or combinations thereof, and withdrawing products from a reactor or reaction zone under steady state conditions continuously over a time period, which is defined by a commencement of the reaction at the beginning of the time period and a cessation of the reaction at the end of the time period. Thus, operation of the reactor systems described herein may include commencement of the reaction, continuous reaction, and cessation of the reaction.

As used herein, the term "catalytic combustion" refers to oxidation of a fuel gas in the presence of a catalyst material, wherein the catalyst material modifies the reaction rate of the oxidation reaction, such as by increasing the reaction rate of the oxidation reaction.

As used herein, the "first temperature" refers to the temperature of the catalyst at the beginning of the commencement process, and the "second temperature" refers to a temperature greater than the first temperature, such as a temperature at which efficient combustion of the supplemental fuel occurs, a temperature within the operating temperature range of the reactor system 102, or other temperature greater than the first temperature.

As previously discussed herein, according to one or more embodiments, the processes disclosed herein may be utilized to commence a continuous reaction in a reactor system for processing one or more chemical streams. In non-limiting examples, the reactor systems disclosed may be utilized to produce light olefins from hydrocarbon feed streams through continuous reaction of the hydrocarbon feed streams. Light olefins may be produced from a variety of feed streams by utilizing different catalysts and reaction mechanisms. For example, light olefins may be produced by at least dehydrogenation reactions, cracking reactions, dehydration reactions, and methanol-to-olefin reactions. These reaction types may utilize different feed streams which are subsequently reacted to form the light olefins using catalysts that may contain platinum, palladium, or combinations thereof. While the processes for commencing a reactor system are described herein the in the context of hydrocarbon processing to form light olefins, it should be understood that it is contemplated that the processes may be utilized to commence any reactor system that includes a catalyst containing platinum, palladium, or combinations of these, or any other chemical constituent in the presence of which the commencement fuel gas may undergo catalytic combustion at temperatures less than 500° C. As such, the presently described processes for commencing a reactor system should not be limited only to embodiments for reactor systems designed to produce light olefins, such as the reactor system in FIG. 1.

The reactor systems and methods for processing the chemical streams will now be discussed in further detail. The chemical stream that is processed may be referred to as a feed stream, which is processed by a reaction to form a product stream. The feed stream may comprise a composition, and depending upon the feed stream composition, an appropriate catalyst may be utilized to convert the contents of the feed stream into a product stream that may include light olefins or other chemical products. For example, a feed stream may comprise at least one of propane, butane, ethane, or ethylbenzene, and the reaction system may be a dehydrogenation system in which the feed stream may be converted to light olefins through dehydrogenation in the presence of a dehydrogenation catalyst, such as a catalyst comprising platinum, palladium, or combinations thereof. Further discussion on appropriate catalysts for use with various feed streams is provided subsequently in this disclosure.

Referring now to FIG. 1, an example reactor system 102 is schematically depicted. The reactor system 102 generally includes a reactor portion 200 and a catalyst processing portion 300. As used herein in the context of FIG. 1, the reactor portion 200 refers to the portion of a reactor system 102 in which the major process reaction takes place. For example, the reactor system 102 may be a dehydrogenation system in which the feed stream is dehydrogenated in the presence of the dehydrogenation catalyst in the reactor portion 200 of the reactor system 102. The reactor portion 200 comprises a reactor 202 which may include a downstream reactor section 230, an upstream reactor section 250, and a catalyst separation section 210, which serves to separate the catalyst from the chemical products formed in the reactor 202.

Also, as used herein, the catalyst processing portion 300 of the system of FIG. 1 generally refers to the portion of a reactor system 102 in which the catalyst is in some way processed, such as by combustion. The catalyst processing portion 300 may comprise a combustor 350 and a riser 330, and may optionally comprise a catalyst separation section 310. The catalyst may be regenerated or otherwise processed by combusting a regenerator fuel source in the combustor 350. In some embodiments, the regenerator fuel source may include coke or other contaminants deposited on the catalyst in the reactor portion 200 of the reactor system 102. In additional embodiments, the regenerator fuel source may be a supplemental fuel stream, such as a stream comprising methane, for example, while operating at steady state.

The supplemental fuel may be utilized to heat the catalyst in the catalyst processing portion 300 if coke or another combustible material is not formed on the catalyst, or an amount of coke formed on the catalyst is not sufficient to heat the catalyst to a desired temperature. In some embodiments, the regenerator fuel source may include any combination of a supplemental fuel stream and coke or other combustible contaminant deposited on the catalyst. Combustion of the regenerator fuel source in the catalyst processing portion 300 may regenerate the catalyst by removing the coke deposits or other contaminants deposited on the catalyst, raising the temperature of the catalyst to an operating temperature range of the reactor portion 200, or both.

In one or more embodiments, the catalyst separation section 210 may be in fluid communication with the combustor 350 (e.g., via standpipe 426) and the catalyst separation section 310 may be in fluid communication with the upstream reactor section 250 (e.g., via standpipe 424 and transport riser 430).

Referring to FIG. 1, general operation of the reactor system 102 to conduct a continuous reaction will be described. During operation of the reactor portion 200 of the reactor system 102, the feed stream may enter the transport riser 430, and the product stream may exit the reactor system 102 via pipe 420. According to one or more embodiments, the reactor system 102 may be operated by feeding a chemical feed (e.g., in a feed stream) and a fluidized catalyst into the upstream reactor section 250. The chemical feed may contact the catalyst in the upstream reactor section 250, and each may flow upwardly into and through the downstream reactor section 230 to produce a chemical product. The chemical product and the catalyst may be passed out of the downstream reactor section 230 to a separation device 220 in the catalyst separation section 210. The catalyst may be separated from the chemical product in the separation device 220. The chemical product may then be transported out of the catalyst separation section 210. For example, the separated vapors may be removed from the reactor system 102 via a pipe 420 at a gas outlet port 216 of the catalyst separation section 210. According to one or more embodiments, the separation device 220 may be a cyclonic separation system, which may include two or more stages of cyclonic separation.

According to some embodiments, following separation from vapors in the separation device 220, the catalyst may generally move through the stripper 224 to the reactor catalyst outlet port 222 where the catalyst may be transferred out of the reactor portion 200 via standpipe 426 and into the catalyst processing portion 300. Optionally, the catalyst may also be transferred directly back into the upstream reactor section 250 via standpipe 422. In some embodiments, the catalyst may be premixed with processed catalyst in the transport riser 430.

The separated catalyst may be passed from the catalyst separation section 210 to the combustor 350 of the catalyst processing portion 300. In the combustor 350, the catalyst may be processed by, for example, combustion. For example, and without limitation, the catalyst may be de-coked and/or supplemental fuel may be combusted to heat the catalyst. The combustor 350 may include an additional lower reactor section inlet port 352 where air inlet 428 connects to the combustor 350. The air inlet 428 may supply reactive gases, such as an oxygen-containing gas or other oxidizer for example, which may react with the spent catalyst or the supplemental fuel to at least partially regenerate the catalyst. The catalyst may be passed out of the combustor 350 and through the riser 330 to a riser termination separator 378, where the gas and solid components from the riser 330 may be at least partially separated. The vapor and remaining solids may be transported to a secondary separation device 320 in the catalyst separation section 310 where the remaining catalyst is separated from the gases from the catalyst processing (e.g., gases emitted by combustion of spent catalyst or supplemental fuel). The combustion gases from regeneration of the catalyst may be removed from the catalyst processing portion 300 via a combustion gas outlet 432.

The separated catalyst may then be passed from the catalyst separation section 310 to the upstream reactor section 250 via standpipe 424 and transport riser 430, where it may be further utilized in a catalytic reaction. Thus, the catalyst, in operation, may cycle between the reactor portion 200 and the catalyst processing portion 300. In general, the processed chemical streams, including the feed streams and product streams may be gaseous, and the catalyst may be fluidized particulate solid.

The vessels, risers, separators, standpipes, and other components of the reactor portion 200 and the catalyst processing portion 300 of the reactor system 102 may include metallic frames, and may additionally include refractory linings or other materials utilized to protect the metallic frame and/or control process conditions. Piping, standpipes, vessels, valves, fittings, and other equipment associated with or coupled to the catalyst processing portion 300 and the reactor portion 200 of the reactor system 102 may also include refractory linings or other materials utilized to protect the metallic frame and/or control process conditions.

Referring to FIG. 1, the catalyst processing portion 300 may include a catalyst hopper 360. The catalyst hopper 360 may include any bin, tank, vessel, or other container suitable for containing and storing the catalyst. The catalyst hopper 360 may be fluidly coupled to the catalyst processing portion 300 by catalyst hopper transfer line 434. Catalyst may be introduced to the catalyst processing portion 300 from the catalyst hopper 360 during commencement of the reaction in the reactor system 102. Additionally, in some embodiments, catalyst may be introduced to the catalyst processing portion 300 from the catalyst hopper 360 during the continuous reaction phase in the reactor system 102, such as to replace lost catalyst, for example.

During continuous reaction phase of operation of the reactor system 102, the catalyst processing portion 300 of the reactor system 102, in particular the combustor 350, may be maintained at a temperature in an operating temperature range. The operating temperature range of the combustor 350 may be greater than or equal to 650° C., greater than or equal to 700° C., or even greater than or equal to 750° C. In some embodiments, the operating temperature range of the combustor 350 may be from 650° C. to 1000° C., from 650° C. to 800° C., from 650° C. to 900° C., from 700° C. to 1000° C., from 700° C. to 900° C., from 700° C. to 800° C., from 750° C. to 1000° C., or even from 750° C. to 900° C. As previous discussed herein, maintaining the operating temperature in the combustor 350 may include combusting a supplemental fuel in the combustor 350.

Figure 2:
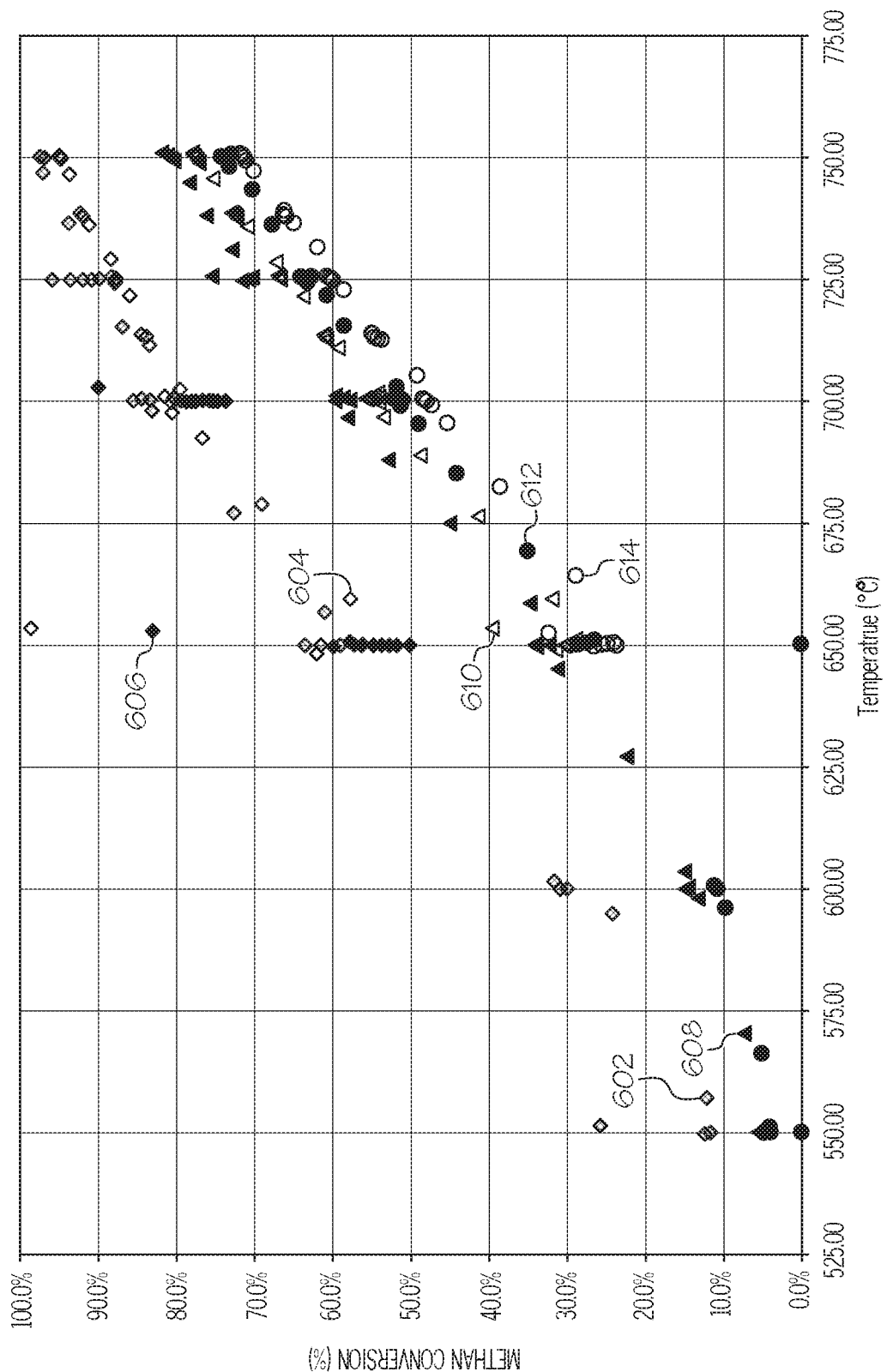
FIG. 2 schematically depicts a graph of the methane conversion (y-axis) as a function of temperature (x-axis) for combustion of methane.

During commencement of the continuous reaction in the fluidized reactor system, the catalyst is charged to the catalyst processing portion 300 of the reactor system 102. The catalyst, which is initially at the first temperature, which is substantially less than the operating temperature of the catalyst processing portion 300, may be heated to increase the temperature of the catalyst from the first temperature to the second temperature. Throughout a portion of or all of the duration of the commencement process, the temperature of the catalyst may be less than the operating temperature range, such as less than 650° C. for example. As previously discussed herein, substantial amounts of methane (e.g., over 50 vol. %) are often included in supplemental fuels for operation of the catalyst processing portion 300 due to the low cost of methane. However, for combustion of methane, the conversion rate is relatively low (e.g., conversion of methane less than 40%) at temperatures less than 650 degrees Celsius (° C.). FIG. 2 graphically depicts the conversion of methane ($CH_4$) as a function of temperature for combustion of pure methane stream in a fluidized reactor system. The conversions for data series 602, 604, and 606 were measured for a methane flow rate of 11 standard cubic centimeters per minute (sccm). The conversions for data series 608 and 610 were measured for a methane flow rate of 22 sccm. The conversions for data series 612 and 614 were measured for a methane flow rate of 33 sccm. As shown in FIG. 2, below 650° C., the conversion of methane is less than about 30% and continues to decrease as the temperature decreases from 600° C. to 550° C. FIG. 2 also shows that the conversion decreases with increasing flow rate of the methane. Thus, observations show that increasing the flow of methane may decrease the conversion. Therefore, according to one or more embodiments, conversion of methane at temperatures below 650° C. may not be efficient for providing the heat sufficient to maintain the temperature of the catalyst in the operating temperature range of the catalyst processing portion 300 of the reactor system 102.

As previously discussed herein, since methane in the supplemental fuel may not combust at a high conversion rates at temperatures below 650° C., fluidized reaction systems that rely on supplemental fuels having methane generally include an external heat source, such as a heated gas stream produced through combustion of a fuel, to increase the temperature of the catalyst in the reactor system during commencement of the continuous reaction. However, heat loss through the refractory lining of vessels and other components of the reactor system 102 to the environment may cause the equilibrium temperature of the catalyst to be substantially less than the operating temperature of the reactor system or the temperature at which the supplemental fuel can be used to heat the catalyst. As previously discussed, some fluidized reactor systems may include a fuel oil system for further increasing the temperature of the catalyst, however, specialized equipment may be required to store and handle the fuel oil.

The processes of the present disclosure for commencing continuous reaction in the reactor system 102 may utilize the catalyst from the reactor system 102 to catalyze the combustion of at least a portion of a commencement fuel gas stream, which may include a commencement fuel gas that undergoes catalytic combustion in the presence of the catalyst at relatively low temperatures, such as temperatures less than 500° C. For example, in some embodiments, a process for commencing a continuous reactions in a reactor system 102 may include heating the catalyst from the first temperature to the second temperature (e.g., the operating temperature of the reactor system 102, a temperature at which the supplemental fuel may be used, or other temperature greater than the first temperature) by contacting the catalyst with the commencement fuel gas stream. In some embodiments, contact of the catalyst with the commencement fuel gas stream may cause combustion of the commencement fuel gas at high conversions (e.g., conversions greater than 50%) at temperatures less than 500° C.

Figure 3:
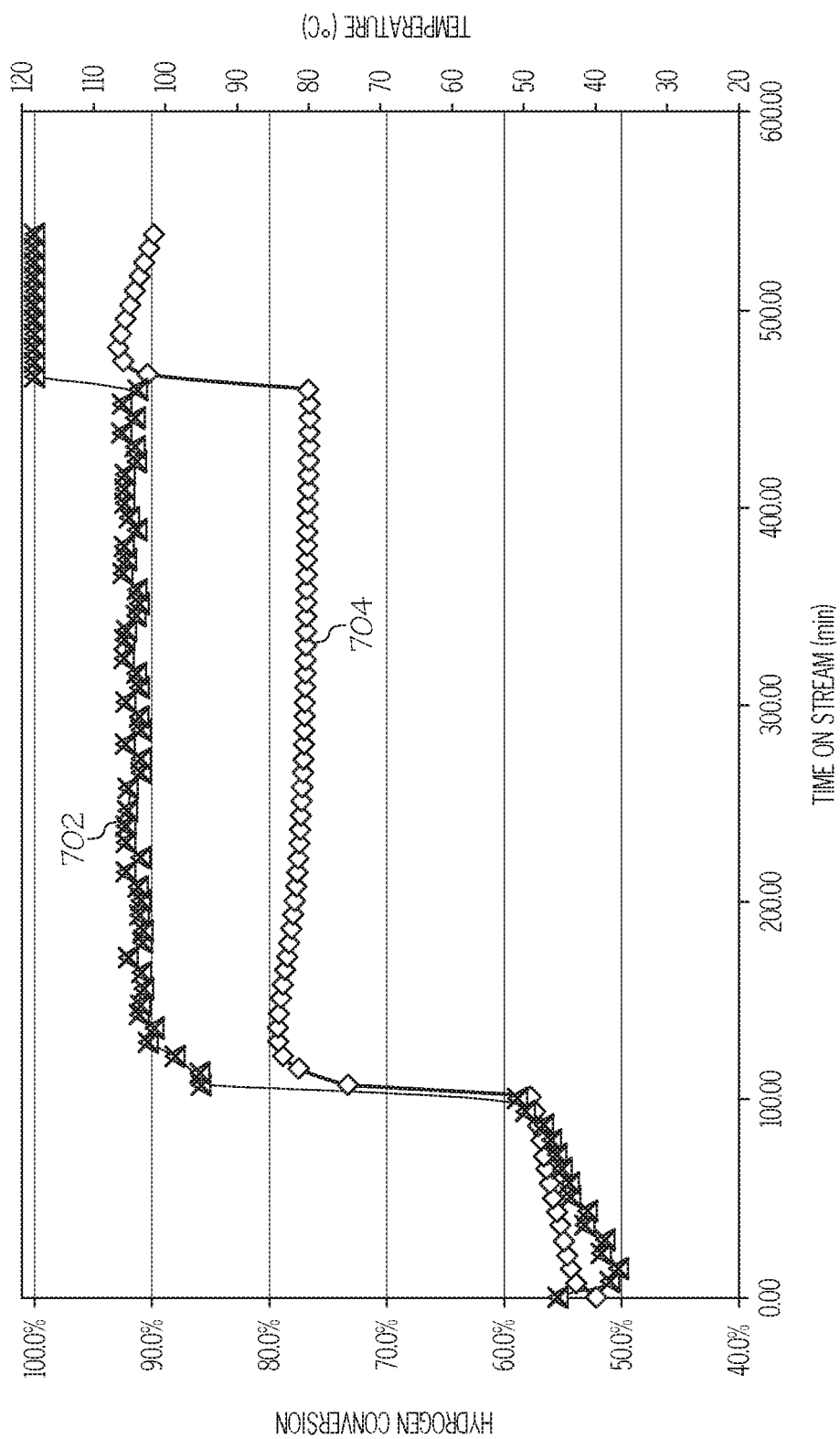
FIG. 3 schematically depicts a graph of hydrogen conversion (y-axis (left)) and temperature (y-axis (right)) as a function of time on stream (x-axis) for catalytic combustion of hydrogen in the presence of a platinum catalyst, according to one or more embodiments described herein.
Figure 6:
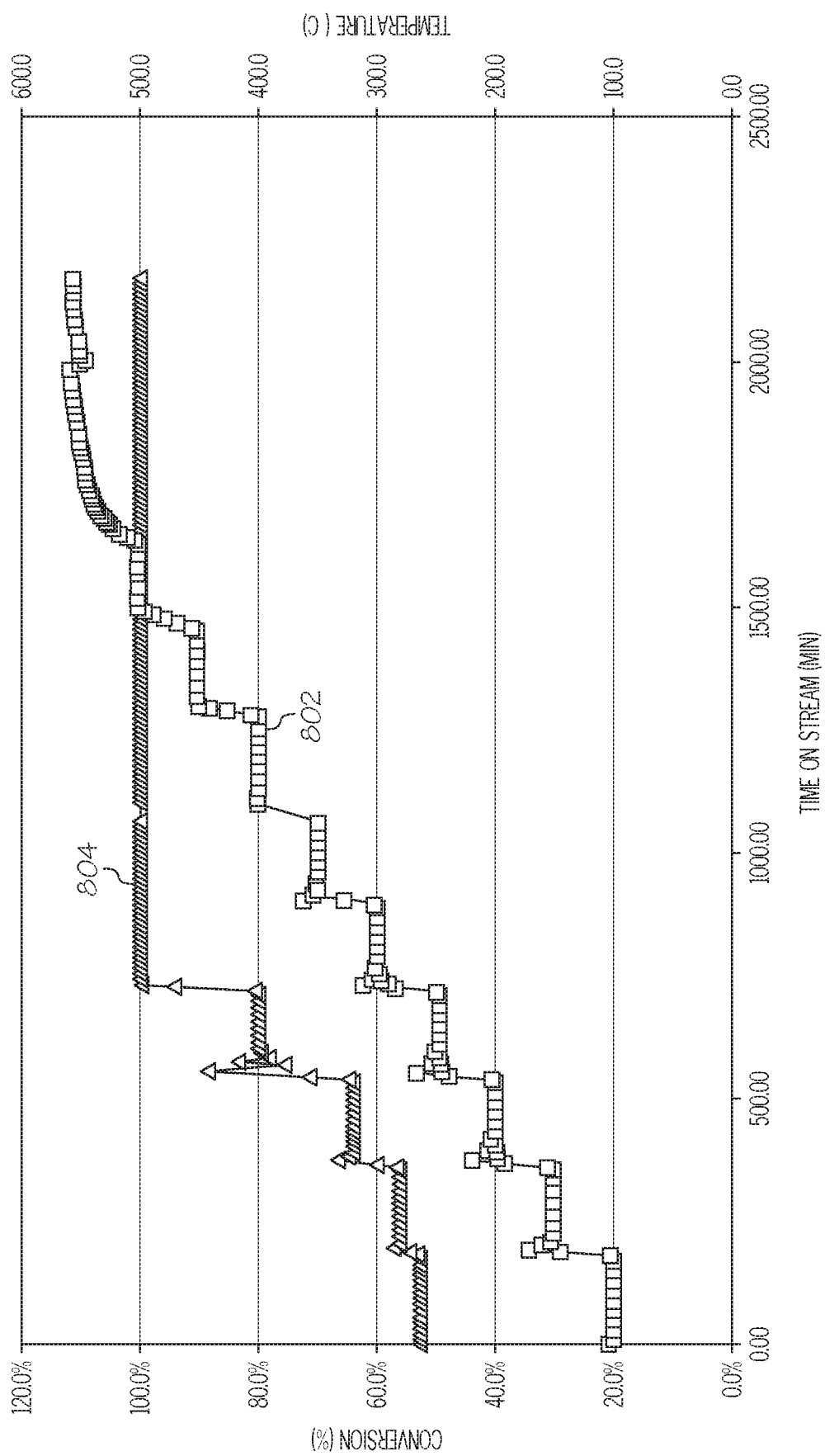
FIG. 6 schematically depicts a graph of ethylene conversion (y-axis (left)) and temperature (y-axis (right)) as a function of time on stream (x-axis) for catalytic combustion of ethylene in the presence of a platinum catalyst, according to one or more embodiments described herein.

For example, FIG. 3 graphically depicts the conversion 702 of a commencement fuel gas stream comprising hydrogen (y-axis—left) and the temperature 704 (y-axis—right) as functions of time-on-stream (TOS) (x-axis) for combustion of hydrogen in the presence of a platinum catalyst. The temperature of the system was increased from 50° C. to about 80° C. after 100 minutes on stream and further increased to over 100° C. at 450 minutes on stream. As shown in FIG. 3, the conversion of hydrogen may be greater than 50% at temperatures between 35° C. and 50° C. At temperatures of about 80° C., the conversion of hydrogen may be greater than 90%. Above 100° C. the conversion of hydrogen may be about 100%. Referring to FIG. 6, the conversion 804 of a commencement fuel gas stream comprising ethylene (y-axis—left) and the temperature 704 (y-axis—right) are shown as functions of time-on-stream (x-axis) for the combustion of ethylene in the presence of a platinum catalyst. During combustion, the temperature of the combustion system was increased by 50° C. at regular time intervals of between 150 and 200 minutes of time-on-stream. As shown in FIG. 6, the conversion of ethylene in the presence of the platinum catalyst was greater than 50% at the start of the combustion process at a temperature of 100° C. At a temperature of about 250° C. the conversion of ethylene increases to about 80%, and at or greater than 300° C., the conversion of ethylene by combustion in the presence of platinum catalyst is 100%.

Thus, in some embodiments, catalytic combustion of the commencement fuel gas, such as hydrogen and/or ethylene for example, in the presence of the catalyst may proceed at high conversions (e.g., conversions greater than 50%) at temperatures less than 500° C. In some embodiments, catalytic combustion of the commencement fuel gas in the presence of the catalyst may proceed without the introduction of a flame or external heat source. Catalytic combustion of the commencement fuel gas may produce heat, which may heat the catalyst from the first temperature to the second temperature.

In some embodiments, the process for commencing a continuous reaction in a reactor system may include introducing the catalyst at the first temperature to the catalyst processing portion 300, contacting the catalyst with the commencement fuel gas stream, and maintaining the contacting of the catalyst with the commencement fuel gas stream until the temperature of the catalyst increases from the first temperature to the second temperature, at which combustion of a regenerator fuel source is sufficient to maintain the temperature of the reactor system 102 and/or catalyst within an operating temperature range of the catalyst processing portion 300.

The catalyst may include a transition metal that is operable to catalyze at relatively high efficiencies the combustion of the commencement fuel gas at temperatures less than 500° C. In some embodiments, the catalyst may include platinum, palladium, or combinations of these. In some embodiments, the catalyst may include a catalyst support, and the platinum, palladium, and/or other catalytic metal may be supported on the catalyst support. The catalyst support may be a metal oxide, such as silica, alumina, silica and alumina, titania, other metal oxide, or combinations of metal oxides. For example, in some embodiments, the catalyst support may be a zeolite, such as a ZSM-5 zeolite for example. The catalytic metal, such as platinum, palladium, and/or other catalytic metal, may be supported on the surface of the catalyst support or incorporated into the catalyst support.

The first temperature of the catalyst may be a storage temperature of the catalyst in the catalyst hopper 360. In some embodiments, the first temperature of the catalyst may be less than a combustion temperature of a supplemental fuel oil, such as kerosene. For example, in some embodiments, the first temperature of the catalyst may be less than or equal to 500° C., less than or equal to 400° C., less than or equal to 300° C., less than or equal to 250° C., less than or equal to 200° C., or even less than or equal to 100° C. The first temperature of the catalyst may be greater than or equal to ambient temperature, such as greater than or equal to 0° C., greater than or equal to 10° C., or even greater than or equal to 20° C. In some embodiments, the first temperature of the catalyst may be from 0° C. to 500° C., from 0° C. to 400° C., from 0° C. to 300° C., from 0° C. to 250° C., from 0° C. to 200° C., from 0° C. to 100° C., from 20° C. to 500°

C., from 20° C. to 400° C., from 20° C. to 300° C., from 20° C. to 250° C., from 20° C. to 200° C., or from 20° C. to 100° C.

Referring to FIG. 1, during commencement of the continuous reaction, the catalyst may be introduced to the catalyst processing portion 300 of the reactor system 102 by passing the catalyst from the catalyst hopper 360, through the catalyst hopper transfer line 434, and into the catalyst processing portion 300. In some embodiments, the catalyst may be introduced to the combustor 350 of the catalyst processing portion 300. In additional embodiments, the catalyst may be introduced to other sections of the catalyst processing portion 300 or reactor portion 200 of the reactor system 102 and conveyed to the combustor 350.

As previously described herein, the commencement fuel gas may be a gas that undergoes combustion in the presence of the catalyst at conversions of greater than 50% (such as greater than 60%, greater than 70%, or even greater than 80%) at temperatures less than or equal to 500° C., less than or equal to 400° C., less than or equal to 300° C., less than or equal to 250° C., less than or equal to 200° C., or even less than or equal to 100° C. For example, in some embodiments, the commencement fuel gas may include hydrogen, one or more alkanes having at least 3 carbon atoms (such as from 3 to 20 carbon atoms), one or more olefins having at least 2 carbon atoms (such as from 2 to 20 carbon atoms), one or more aromatic hydrocarbons, or combinations of these. Alkanes having at least 3 carbon atoms may include, but are not limited to, propane, butane, isobutene, pentane, other alkanes with at least 3 carbon atoms, or combinations of these. Olefins having at least 2 carbon atoms may include, but are not limited to, ethylene, propylene, 1-butene, 2-butene, isobutene, other olefins having at least 2 carbon atoms, or combinations of these. Aromatic hydrocarbons may include, but are not limited to benzene, toluene, xylene, other aromatic hydrocarbons, or combinations of these. In some embodiments, the commencement fuel gas may be selected from the group consisting of hydrogen, propane, n-butane, isobutane, ethylene, propylene, 1-butene, 2-butene, isobutene, benzene, toluene, xylene, or combinations thereof.

In some embodiments, the commencement fuel gas stream may include greater than or equal to 80 mol % commencement fuel gas based on the total molar flow rate of the commencement fuel gas stream. For example, in some embodiments, the commencement fuel gas may include greater than or equal to 80 mol %, greater than or equal to 90 mol %, greater than or equal to 95 mol %, greater than or equal to 99 mol %, or even greater than 99.9 mol % commencement fuel gas based on the total molar flow rate of the commencement fuel gas stream. In some embodiments, the commencement fuel gas stream may be a purity hydrogen stream comprising greater than or equal to 99 mol % hydrogen based on the total molar flow rate of the commencement fuel gas stream. In other embodiments, the commencement fuel gas stream may be an off-gas stream from a hydrocarbon processing plant, the off-gas stream including greater than or equal to 80 mol % hydrogen based on the total molar flow rate of the off-gas stream. In still other embodiments, the commencement fuel gas stream may include greater than or equal to 80 mol % ethylene based on the total molar flow rate of the commencement fuel gas stream. In some embodiments, the commencement fuel gas stream may include a combination of hydrogen and ethylene.

Referring to FIG. 1, the commencement fuel gas stream 500 may be introduced to the combustor 350 of the catalyst processing portion 300. In some embodiments, the commencement fuel gas stream 500 may be introduced to the combustor 350 through one or more distributors (not shown) disposed within the combustor 350. Before introducing the commencement fuel gas stream 500 to the combustor 350, the commencement fuel gas stream 500 may be passed through a compressor 502 to increase the pressure of the commencement fuel gas stream 500. The commencement fuel gas stream 500 can be supplied to the combustor 350 at a pressure of from 5 pounds per square inch gauge (psig) to 200 psig (from 34.47 kilopascals (kPa) to 1378.95 kPa, where 1 psig=6.89 kPa). In some embodiments, a control valve may be included to control the flow rate of the commencement fuel gas and adjust the pressure of the commencement fuel gas to equal the operating pressure of the unit reactor system 102 and/or the combustor 350. In some embodiments, the compressor 502 may be operable to increase a temperature of the commencement fuel gas stream 500 to a commencement fuel gas inlet temperature that is at least greater than ambient temperature, such as greater than or equal to 50° C., greater than or equal to 60° C., greater than or equal to 80° C., or even greater than or equal to 100° C. In some embodiments, the commencement fuel gas stream 500 may be preheated, such as by passing the commencement fuel gas stream 500 through an optional heat exchanger (not shown), to increase the temperature to greater than ambient temperature, such as greater than or equal to 50° C., greater than or equal to 60° C., greater than or equal to 80° C., or even greater than or equal to 100° C.

Referring still to FIG. 1, the commencement fuel gas stream 500 introduced to the combustor 350 may be contacted with the catalyst in the combustor 350. In some embodiments, the catalyst may be circulated through the reactor system 102 during commencement of the continuous reaction. For example, the catalyst may be continuously circulated through the catalyst processing portion 300 and reactor portion 200 of the reactor system 102 during commencement. In some embodiments, the catalyst may be fluidized within the combustor 350 during commencement and may not be circulated through the reactor portion 200 of the reactor system 102.

Contact of the commencement fuel gas stream 500 with the catalyst in the combustor 350 may cause combustion of the commencement fuel gas in the commencement fuel gas stream 500. The heat generated by combustion of the commencement fuel gas may increase the temperature of the catalyst in the combustor 350. Maintaining the contacting of the commencement fuel gas stream 500 with the catalyst may increase the temperature of the catalyst from the first temperature to the second temperature. Maintaining contacting of the commencement fuel gas stream 500 with the catalyst may include maintaining the flow of the commencement fuel gas stream 500 to the combustor 350 throughout the process of commencing the continuous reaction.

As described herein, the "second temperature" of the catalyst may be a temperature at which combustion of the regenerator fuel source is sufficient to heat the catalyst and maintain the operating temperature range in the catalyst processing portion 300 of the reactor system 102. For example, in some embodiments, the second temperature may be a temperature at which combustion of coke deposits formed on the catalyst provides sufficient heat to maintain the operating temperature of the catalyst processing portion 300 of the reactor system 102. In some embodiments the second temperature may be a temperature at which conversion for combustion of the supplemental fuel is sufficient to maintain the operating temperature of the catalyst processing portion 300. In some embodiments, the second temperature may be greater than or equal to 650° C., greater than or equal to 700° C., or even greater than or equal to 750° C.

Maintaining contact of the commencement fuel gas stream 500 with the catalyst may increase the temperature of the catalyst from the first temperature to the second temperature. In some embodiments, maintaining contact of the commencement fuel gas stream 500 with the catalyst may increase the temperature of the catalyst from less than 500° C. to greater than or equal to 650° C., from less than 500° C. to greater than or equal to 700° C., from less than 500° C. to greater than or equal to 750° C., from less than or equal to 400° C. to greater than or equal to 650° C., from less than or equal to 400° C. to greater than or equal to 700° C., from less than or equal to 400° C. to greater than or equal to 750° C., from less than or equal to 300° C. to greater than or equal to 650° C., from less than or equal to 300° C. to greater than or equal to 700° C., from less than or equal to 300° C. to greater than or equal to 750° C., from less than or equal to 250° C. to greater than or equal to 650° C., from less than or equal to 250° C. to greater than or equal to 700° C., from less than or equal to 250° C. to greater than or equal to 750° C., from less than or equal to 200° C. to greater than or equal to 650° C., from less than or equal to 200° C. to greater than or equal to 700° C., from less than or equal to 200° C. to greater than or equal to 750° C., from less than or equal to 100° C. to greater than or equal to 650° C., from less than or equal to 100° C. to greater than or equal to 700° C., or from less than or equal to 100° C. to greater than or equal to 750° C.

Increasing the temperature of the catalyst to the second temperature through catalytic combustion of the commencement fuel gas in the commencement fuel gas stream 500 in the presence of the catalyst may replace fuel oil systems for heating the catalyst during commencement of continuous operation. The use of the commencement fuel gas stream 500 may, therefore, eliminate the need for the fuel oil drum, transfer pumps, control equipment, fuel oil offloading equipment, and other components of a typical fuel oil system. The use of the commencement fuel gas stream 500 to heat the catalyst may also eliminate the need for the additional fuel oil distributor in the combustor 350 and the air purge system for purging the fuel oil system.

In some embodiments, the process for commencing the continuous reaction in the reactor system 102 may include drying the refractory lining of the components of the reactor system 102. In some embodiments, drying the refractory lining of the reactor system may be performed before introducing the catalyst to the catalyst processing portion 300 of the reactor system 102. Drying the refractory lining of the reactor system 102 may include introducing a heated gas to the reactor system 102. The heated gas may have a temperature of greater than or equal to 100° C.

Referring to FIG. 1, in some embodiments, the heated gas 520 used to dry the refractory lining of the reactor system 102 may be heated air, flue gas from direct combustion, an inert gas such as helium, argon, or nitrogen for example, or combinations of these. Other gas streams may also be used for the heated gas 520. In some embodiments, the heated gas 520 may be a heated flue gas produced by combusting a fuel in the combustion device 522. In some embodiments, the combustion device 522 may be fired heater.

Alternatively or additionally, in some embodiments, the commencement fuel gas stream 500 may be utilized to dry the refractory lining of the reactor system 102. For example, in some embodiments, the compressor 502 may increase the temperature of the commencement fuel gas stream 500 to a temperature sufficient to dry the refractory linings of the reactor system 102. In some embodiments, the compressor 502 may increase the temperature of the commencement fuel gas stream 500 to a temperature greater than or equal to 100° C., or even greater than or equal to 130° C. when mixed in the catalyst process section in the presence of catalyst. In some embodiments, drying the refractory lining may include increasing a temperature of the commencement gas stream to a temperature of greater than or equal to 100° C. in the presence of catalyst, and circulating the heated catalyst through the reaction system. In some embodiments, utilizing the catalyst heated by the combustion of the commencement fuel gas stream 500 to dry the refractory lining of the reactor system 102 may reduce or eliminate the need for the combustion device 522 to produce a hot flue gas to dry the refractory lining.

In some embodiments, the commencement fuel gas stream 500 may include an off-gas stream from a hydrocarbon processing facility. In these embodiments, the commencement fuel gas stream 500 may include methane or other organic gases that may not combust at high conversion rates of greater than 50% in the presence of the catalyst at temperatures below the operating temperature range of the reactor system 102 (such as at the first temperature of the catalyst). For example, in some embodiments, the commencement fuel gas stream 500 may include greater than or equal to 10 wt. % methane, greater than or equal to 20 wt. % methane, greater than or equal to 30 wt. % methane, or even greater than or equal to 40 wt. % methane. As previously discussed herein in relation to FIG. 2, methane may not undergo substantial combustion at temperatures less than about 650° C. During most or all of the commencement process, the temperatures of the catalyst and the reactor system 102 may be less than 650° C. Therefore, any methane in the commencement fuel gas stream 500 can be expected to pass through the catalyst processing portion 300 and exit from the catalyst processing portion 300 by the combustion gas outlet 432. Pass-through of the methane in the commencement fuel gas stream 500 could potentially result in a hazardous condition downstream of the catalyst processing portion 300.

Figure 4:
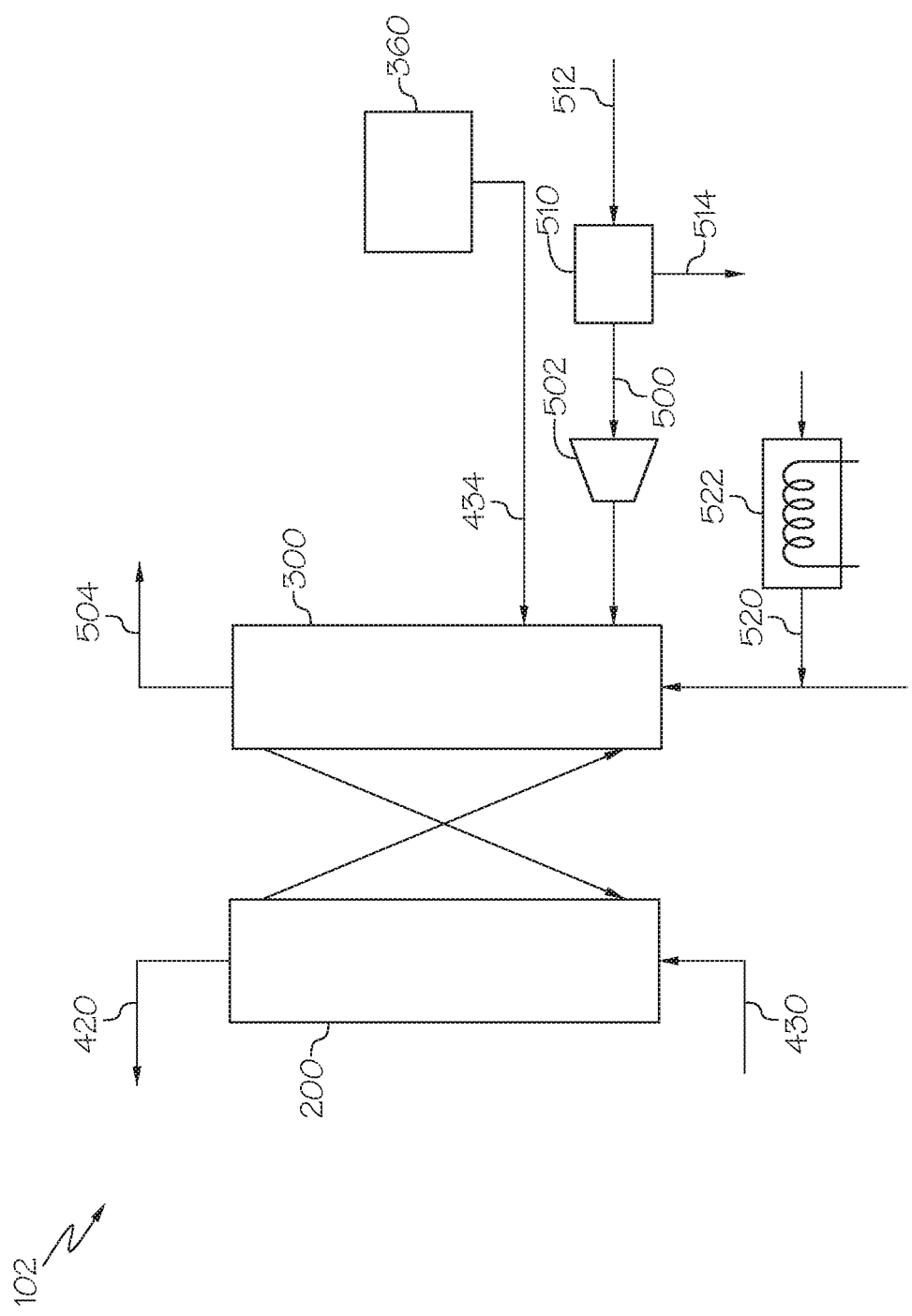
FIG. 4 schematically depicts a reaction system flow chart, according to one or more embodiments described herein.

In some embodiments, the process for commencing the continuous reaction in the reactor system 102 may include removing at least a portion of the methane and/or other non-catalytically-combustible organic gases from the commencement fuel gas stream 500 before contacting the commencement fuel gas stream 500 with the catalyst. Referring to FIG. 4, in some embodiments, the reactor system 102 may include a separator 510 for removing methane from an off-gas stream 512 to produce the commencement fuel gas stream 500. An off-gas stream 512 may be introduced to the separator 510, and the separator 510 may remove at least a portion of the methane from the off-gas stream 512 to produce the commencement fuel gas stream 500 and a methane-rich stream 514. The commencement fuel gas stream 500 may then be introduced to the catalyst in the combustor 350. In some embodiments, the methane-rich stream 514 may be further processed downstream of the separator 510. Although described in relation to removing methane from on off-gas stream 512 to produce the commencement fuel gas stream 500, the separator 510 may also be operable to remove other compounds, such as other organic compounds that do not undergo catalytic combustion in the presence of the catalyst, from the off-gas stream 512 or other gas stream containing the commencement fuel gas.

Figure 5:
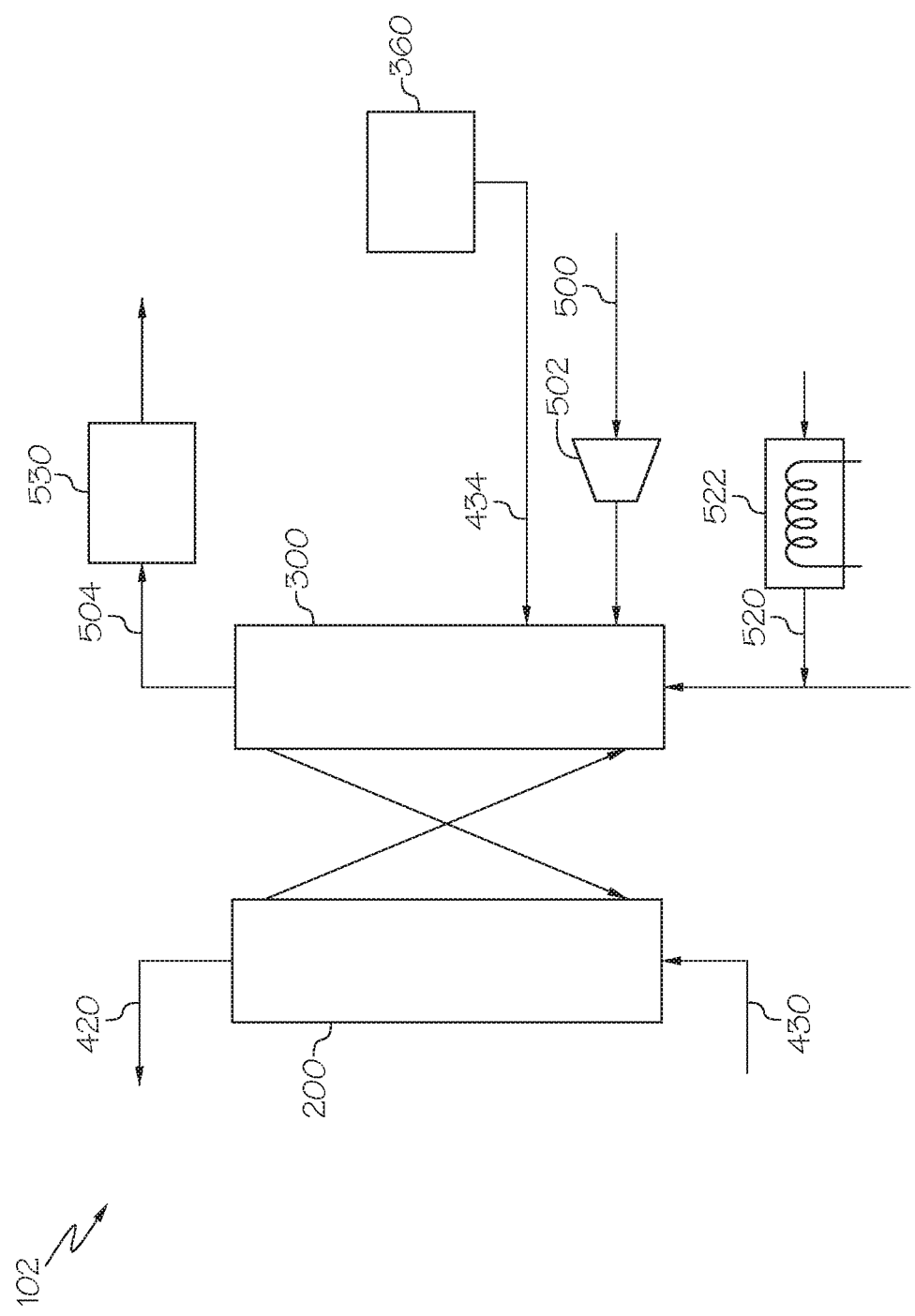
FIG. 5 schematically depicts another reaction system flow chart, according to one or more embodiments described herein.

In some embodiments, the process for commencing the continuous reaction in the reactor system 102 may include removing carbon compounds, such as methane and other organic gases, from the combustion gas produced from combustion of the commencement fuel gas stream 500 in the combustor 350 (FIG. 1) and passed out of the reactor system 102. Referring to FIG. 5, in some embodiments, the reactor system 102 may include a combustion gas treatment system 530 for removing methane and other organic gases from the combustion gas 504 passed out of the catalyst processing portion 300 of the reactor system 102. In some embodiments, the combustion gas treatment system 530 may include an incinerator operable to combust the methane and/or other organic gases in the combustion gas 504. Other known processes for removing organic compounds from a gas stream may also be included in the combustion gas treatment system 530. Although described in relation to removing methane from the combustion gas 504 passed out of the reactor system 102, the combustion gas treatment system 530 may also be operable to remove other compounds, such as other organic compounds or un-combusted hydrogen gas for example, from the combustion gas 504.

The process of commencing the continuous reaction in the reactor system 102 may be utilized to commence the continuous reaction in any fluidized reactor system that includes a catalyst having platinum, palladium, or combinations thereof. For example, in some embodiments, the reactor system 102 may include a dehydrogenation reaction system, a catalytic cracking reaction system, a dehydration reaction system, or a methanol-to-olefin reaction system.

According to one or more embodiments, the reaction in the reactor system 102 may be a dehydrogenation reaction. According to such embodiments, the feed stream may comprise one or more of ethane, propane, n-butane, and i-butane. In some embodiments, the feed stream may include at least 50 wt. % ethane, propane, n-butane, i-butane, or combinations thereof. In one or more embodiments, a dehydrogenation reaction may utilize a catalyst that includes platinum, and optionally gallium. The platinum, and optionally the gallium, may be carried by an alumina or alumina silica support, and may optionally comprise potassium. Such platinum catalysts are disclosed in U.S. Pat. No. 8,669,406, which is incorporated herein by reference in its entirety.

In some embodiments, the reaction may be a cracking reaction. According to such embodiments, the feed stream may comprise one or more of naphtha, n-butane, or i-butane. For example, if the reaction is a cracking reaction, the feed stream may include at least 50 wt. % naphtha, n-butane, i-butane, or combinations thereof. In one or more embodiments, a cracking reaction may utilize one or more zeolites as a catalyst. In some embodiments, the one or more zeolites utilized in the cracking reaction may comprise a ZSM-5 zeolite. However, it should be understood that other suitable catalysts may be utilized to perform the cracking reaction. In some embodiments, the cracking catalyst may include platinum. For example, the cracking catalyst may include from 0.001 wt. % to 0.05 wt. % of platinum. The platinum may be sprayed on as platinum nitrate and calcined at an elevated temperature, such as around 700° C.

According to some embodiments, the reaction may be a dehydration reaction. According to such embodiments, the feed stream may comprise one or more of ethanol, propanol, or butanol. For example, if the reaction is a dehydration reaction, then the feed stream may include at least 50 wt. % ethanol, propanol, butanol, or combinations of these. In one or more embodiments, a dehydration reaction may utilize one or more acid catalysts. In some embodiments, the one or more acid catalysts utilized in the dehydration reaction may comprise a zeolite (such as ZSM-5 zeolite), alumina, amorphous aluminosilicate, acid clay, or combinations thereof. In some embodiments, the catalyst may further include platinum, palladium, or combinations of these supported by the acid catalyst. It should be understood that other suitable catalysts may be utilized to perform the dehydration reaction.

According to one or more embodiments, the reaction may be a methanol-to-olefin reaction. According to such embodiments, the feed stream may comprise methanol. For example, if the reaction is a methanol-to-olefin reaction, then the feed stream may comprise at least 50 wt. % methanol. In one or more embodiments, a methanol-to-olefin reaction may utilize one or more zeolites as a catalyst. In such embodiments, the catalyst may comprise one or more zeolites. In some embodiments, the one or more zeolites utilized in the methanol-to-olefin reaction may comprise a one or more of a ZSM-5 zeolite or a SAPO-34 zeolite. In some embodiments, the catalyst may further include platinum, palladium, or combinations thereof. However, it should be understood that other suitable catalysts may be utilized to perform the methanol-to-olefin reaction.

For the purposes of describing and defining the present invention it is noted that the term "about" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Generally, "inlet ports" and "outlet ports" of any system unit of the reactor system 102 described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit of the reactor system 102 to which a pipe, conduit, tube, hose, material transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A process for commencing a continuous reaction in a reactor system, the process comprising:
introducing a catalyst to a combustor of a catalyst processing portion of the reactor system, wherein the catalyst initially has a first temperature of 500° C. or less;
contacting the catalyst at the first temperature with a commencement fuel gas in the combustor, wherein the commencement fuel gas comprises at least 80 mol % fuel gas, where the fuel gas is selected from the group consisting of hydrogen, an alkane having at least 3 carbon atoms, an olefin having at least 2 carbon atoms, an aromatic hydrocarbon, and combinations of these, and contacting of the catalyst with the commencement fuel gas in the combustor at the first temperature of 500° C. or less causes catalytic combustion of the commencement fuel gas;
maintaining the contacting of the catalyst with the commencement fuel gas until the temperature of the catalyst increases from the first temperature to a second temperature of at least 650° C.; and
when the temperature of the catalyst is greater than or equal to the second temperature, introducing a regenerator fuel source to the catalyst processing portion, wherein:
the regenerator fuel source comprises a supplemental fuel gas different from the commencement fuel gas and combustion of the regenerator fuel source maintains an operating temperature range in the catalyst processing portion.

2. The process of claim 1, wherein the second temperature is at least 700° C.

3. The process of claim 1, wherein the first temperature is less than or equal to 400° C.

4. The process of claim 1, wherein the catalyst comprises platinum, palladium, or combinations of these.

5. The process of claim 1, wherein the commencement fuel gas comprises at least one compound selected from the group consisting of hydrogen, propane, n-butane, isobutane, ethylene, propylene, 1-butene, 2-butene, isobutene, pentene, benzene, toluene, xylene, or combinations of these.

6. The process of claim 1, wherein the commencement fuel gas comprises hydrogen, ethylene, or combinations of these.

7. The process of claim 1, wherein the regenerator fuel source comprises methane.

8. The process of claim 1, wherein the regenerator fuel source further comprises coke deposited on the catalyst.

9. The process of claim 1, further comprising drying a refractory lining of the reactor system before introducing the catalyst to the catalyst processing portion of the reactor system.

10. The process of claim 9, wherein drying the refractory lining includes introducing a heated gas to the reactor system, wherein the heated gas has a temperature of greater than or equal to 100° C.

11. The process of claim 1, further comprising drying a refractory lining of the reactor system, wherein drying the refractory lining of the reactor system comprises:
increasing a temperature of the commencement fuel gas with hot air in the presence of catalyst in a catalyst processing vessel to a temperature of greater than or equal to 100° C.; and
circulating the heated catalyst that was produced by combustion of the commencement fuel gas through the reactor system.

12. The process of claim 1, further comprising removing at least a portion of methane from an off gas stream to produce the commencement fuel gas.

13. The process of claim 1, further comprising removing carbon compounds from a combustion gas produced from combustion of the commencement fuel gas and passed out of the reactor system.

14. The process of claim 1, wherein the reactor system comprises a dehydrogenation reaction system, a catalytic cracking reaction system, a dehydration reaction system, or a methanol-to-olefin reaction system.

15. The process of claim 1, comprising ceasing contact of the catalyst with the commencement fuel gas when the temperature of the catalyst is greater than or equal to 650° C.

16. The process of claim 1, wherein the reactor system is a catalytic dehydrogenation system for converting ethane, propane, butane, or ethylbenzene to olefins.

17. The process of claim 1, further comprising introducing a hydrocarbon feed to the reactor system when the temperature of the catalyst is greater than or equal to the second temperature, wherein the hydrocarbon feed comprises ethane, propane, butane, ethylbenzene, or combinations of these.

18. The process of claim 1, wherein the supplemental fuel gas is introduced to the combustor only when the temperature of the catalyst is greater than or equal to 650° C.

19. The process of claim 1, wherein the catalytic combustion of the commencement fuel gas proceeds through contact with the catalyst and without introduction of a flame or external heat source.

20. The process of claim 1, wherein the commencement fuel gas is not combusted prior to contact with the catalyst while increasing the temperature of the catalyst from the first temperature to the second temperature of at least 650° C.

* * * * *